(12) United States Patent
Han (10) Patent No.: US 11,789,719 B2
(45) Date of Patent: Oct. 17, 2023

(54) FIRMWARE MASSIVE UPDATE METHOD USING FLASH MEMORY AND COMPUTER PROGRAM STORED IN RECORDING MEDIA FOR EXECUTING THE SAME

(71) Applicant: Security Platform Inc., Seongnam-si (KR)

(72) Inventor: Kyung Tae Han, Seoul (KR)

(73) Assignee: SECURITY PLATFORM INC., Seongnam-si (KR)

( * ) Notice: Subject to any disclaimer, the term of this patent is extended or adjusted under 35 U.S.C. 154(b) by 126 days.

(21) Appl. No.: 17/506,800

(22) Filed: Oct. 21, 2021

(65) Prior Publication Data

US 2023/0039533 A1 Feb. 9, 2023

(30) Foreign Application Priority Data

Aug. 3, 2021 (KR) .......................... 10-2021-0102087

(51) Int. Cl.
*G06F 9/00* (2006.01)
*G06F 8/654* (2018.01)
*G06F 8/61* (2018.01)
*G06F 12/02* (2006.01)
*G06F 9/54* (2006.01)
*G06F 9/4401* (2018.01)

(52) U.S. Cl.
CPC ................ *G06F 8/654* (2018.02); *G06F 8/63* (2013.01); *G06F 9/4401* (2013.01); *G06F 9/547* (2013.01); *G06F 12/0246* (2013.01); *G06F 9/4406* (2013.01)

(58) Field of Classification Search
CPC .......... G06F 8/654; G06F 8/63; G06F 9/4401; G06F 9/547; G06F 12/0246; G06F 21/57
USPC .......................................................... 713/2
See application file for complete search history.

(56) References Cited

U.S. PATENT DOCUMENTS

| 10,019,253 B2 * | 7/2018 | Vidyadhara | ............. G06F 8/656 |
| 2008/0178171 A1 * | 7/2008 | Sueyoshi | ................... G06F 8/65 |
| | | | 717/171 |
| 2010/0218178 A1 * | 8/2010 | Sakai | ................. H04N 1/00973 |
| | | | 717/173 |

(Continued)

FOREIGN PATENT DOCUMENTS

| KR | 10-2014-0058281 A | 5/2014 |
| KR | 10-2017-0056018 A | 5/2017 |

(Continued)

*Primary Examiner* — Volvick Derose
(74) *Attorney, Agent, or Firm* — KORUS Patent, LLC; Seong Il Jeong (57) ABSTRACT

A firmware massive update method using a flash memory includes: a firmware data registration step of receiving, from a manufacturer server, at least one of information of a user device that is a firmware update target, and firmware information and registering the received information as firmware data; a firmware data management step of receiving a request from a firmware update server in which the registered firmware data is stored, and storing and managing the registered firmware data in a specific area of a flash memory included in the user device via a network; and a firmware update execution step of executing a firmware update on the firmware data managed in the specific area of the flash memory included in the user device through the firmware update server.

10 Claims, 3 Drawing Sheets

(56) References Cited

U.S. PATENT DOCUMENTS

| | | | |
|---|---|---|---|
| 2012/0159142 A1* | 6/2012 | Jibbe | G06F 8/71 |
| | | | 713/100 |
| 2013/0198507 A1* | 8/2013 | Kasuya | G06F 8/65 |
| | | | 713/100 |
| 2014/0331218 A1* | 11/2014 | Kryzer | G06F 8/65 |
| | | | 717/170 |
| 2015/0170145 A1* | 6/2015 | Patel | G06Q 20/3278 |
| | | | 705/44 |
| 2016/0099922 A1* | 4/2016 | Dover | H04L 9/0822 |
| | | | 713/171 |
| 2016/0112470 A1* | 4/2016 | Pai | H04L 65/1073 |
| | | | 709/223 |
| 2016/0371074 A1* | 12/2016 | Vyas | H04W 4/60 |
| 2017/0017485 A1* | 1/2017 | Ye | G06F 8/656 |
| 2018/0152341 A1* | 5/2018 | Maeda | H04L 41/082 |
| 2019/0377569 A1* | 12/2019 | Harada | H04L 67/34 |
| 2020/0042465 A1* | 2/2020 | Duval | G06F 12/1466 |

FOREIGN PATENT DOCUMENTS

| | | |
|---|---|---|
| KR | 10-2018-0131840 A | 12/2018 |
| KR | 10-2021-0027499 A | 3/2021 |

* cited by examiner

FIRMWARE MASSIVE UPDATE METHOD USING FLASH MEMORY AND COMPUTER PROGRAM STORED IN RECORDING MEDIA FOR EXECUTING THE SAME

CROSS-REFERENCE TO RELATED APPLICATION

This application claims the benefit of Korean Patent Application No. 10-2021-0102087, filed on Aug. 3, 2021, in the Korean Intellectual Property Office, the disclosure of which is incorporated herein in its entirety by reference.

BACKGROUND

1. Field

The present invention relates to a firmware massive update method using a flash memory and a computer program stored in a recording media for executing the same, and more particularly, to a firmware massive update method using a flash memory and a computer program stored in a recording media for executing the same, wherein, when a new version of a firmware image or data is updated to Micron's Authenta Flash, the firmware image is recorded to a specified address through an update server.

2. Description of Related Art

Software for performing various functions is incorporated in an electronic device. The software is referred to as embedded software or firmware. With the rapid development of processors, the role of firmware is also increasing in various ways.

In general, firmware is continuously implemented so as to reflect additional customer requirements or solve problems inherent in hardware or software, and firmware update of a device is made in various ways including wired and wireless methods.

However, malfunctions of devices may be caused due to defective firmware. In this case, firmware update is required. In addition, firmware update is required in a process of updating hardware of devices.

However, in practice, it takes a lot of time and cost to update firmware of devices. In consideration of this point, there is a need for a technology for updating firmware by using a communication network. Recently, a technology for updating firmware by using a communication network has been introduced, but only a simple firmware update is introduced, and the reliability or stability of the update is not guaranteed.

Therefore, there is an urgent need for a firmware massive update method using a flash memory and a computer program stored in a recording media for executing the same, wherein, when a new version of a firmware image or data is updated in Micron's Authenta Flash so as to ensure the reliability or stability of the update, the firmware image is recorded to a specified address through an update server.

CITATION LIST

Patent Literature (Patent Literature 0001) Korean Patent Laid-Open No. 10-2017-0056018

(Patent Literature 0002) Korean Patent Laid-Open No. 10-2021-0027499

SUMMARY

The present invention has been made in an effort to solve the problems of the related art, and an object of the present invention is to provide a firmware massive update method and a computer program stored in a recording media for executing the same, wherein, when a firmware image is updated to Authenta flash by using characteristics of Authenta flash, the difference from the existing firmware image is calculated in blocks to minimize data transmission and improve performance, while overcoming an environment where, due to the nature of Authenta flash, it is impossible to transfer and record the entire image at once, so even if the firmware image is very large and has not much changed in the new version of the firmware, the entire firmware image should be recorded, and an environment where, when update is executed to many devices at the same time, too much time and network resources are consumed and the technique of calculating and updating the difference value cannot be applied due to the nature of Authenta flash.

However, the technical problems to be achieved by the present embodiment are not limited to the technical problems described above, and other technical problems may exist.

In order to achieve the objects, the present invention includes: a firmware data registration step of receiving, from a manufacturer server, at least one of information of a user device that is a firmware update target, and firmware information and registering the received information as firmware data; a firmware data management step of receiving a request from a firmware update server in which the registered firmware data is stored, and storing and managing the registered firmware data in a specific area of a flash memory included in the user device via a network; and a firmware update execution step of executing a firmware update on the firmware data managed in the specific area of the flash memory included in the user device through the firmware update server.

In addition, the firmware data management step includes storing and managing the registered firmware data in the specific area of the flash memory as a firmware image, and the firmware update execution step includes executing the firmware update based on the firmware image.

In addition, the firmware update execution step includes comparing a firmware image subjected to firmware update with an existing firmware image in units of 4 KB to 64 KB and transmitting, to the user device, only a data value of an address where a difference occurs.

In addition, the firmware data management step includes operating the user device by storing a boot image in an area A of the specific area of the flash memory.

In addition, the firmware data management step includes setting an area A of the specific area of the flash memory as an Authenticated Modify (AM) block.

In addition, the firmware data management step includes, when the boot image is changed, storing a new boot image in an area B of the specific area of the flash memory through a command.

In addition, in the firmware data management step, before the new boot image is copied to the area B of the specific area of flash memory, new boot image data is erased in units of 4 KB to 64 KB through a Subsector_Erase (Erase Data) command, and only a start address value is specified.

In addition, in the firmware data management step, when the firmware image is changed, only first to 4096th values are stored at a start position of an address value where an existing boot image is stored, without storing an entire changed boot image in the area A of the specific area of flash memory.

In addition, the firmware data management step includes copying the new boot image, which is stored in the area B of the specific area of the flash memory, to the area A of the specific area of the flash memory.

In addition, in the firmware data management step, before the new boot image is copied to the area A of the specific area of flash memory, new boot image data is erased in units of 4 KB to 64 KB through a Subsector_Erase (Erase Data) command, and only a start address value is specified.

In addition, the firmware data management step includes configuring the network based on a gRPC (gRPC Remote Procedure Calls) protocol.

In addition, the firmware data management step includes receiving a request from the user device to store the registered firmware data in the specific area of the flash memory through an update application included in the firmware update server.

In addition, the present invention provides a computer program stored in a recording media for executing the above-described method.

DETAILED DESCRIPTION

The terms or words used in the present specification and the claims should not be construed as being limited to ordinary or dictionary meanings. The inventors should be construed as meanings and concepts consistent with the technical idea of the present invention, based on the principle that the concept of the terms can be appropriately defined in order to explain their invention in the best way.

The configuration shown in the embodiments and drawings described in this specification is only the most preferred embodiment of the present invention, and does not represent all the technical idea of the present invention. Therefore, it should be understood that various equivalents and modifications may be substituted for them at the time of filing the present application.

The terms as used herein are those defined by taking into account functions in the present invention, but the terms may vary depending on the intention of producers, precedents, or the like. Therefore, the definitions should be made based on the contents throughout the specification. When the detailed description of the relevant known functions or configurations is determined to unnecessarily obscure the gist of the present invention, the detailed description thereof may be omitted.

Hereinafter, a firmware massive update method using a flash memory and a computer program stored in a recording media for executing the same according to the present invention will be described with reference to the drawings.

Figure 1:
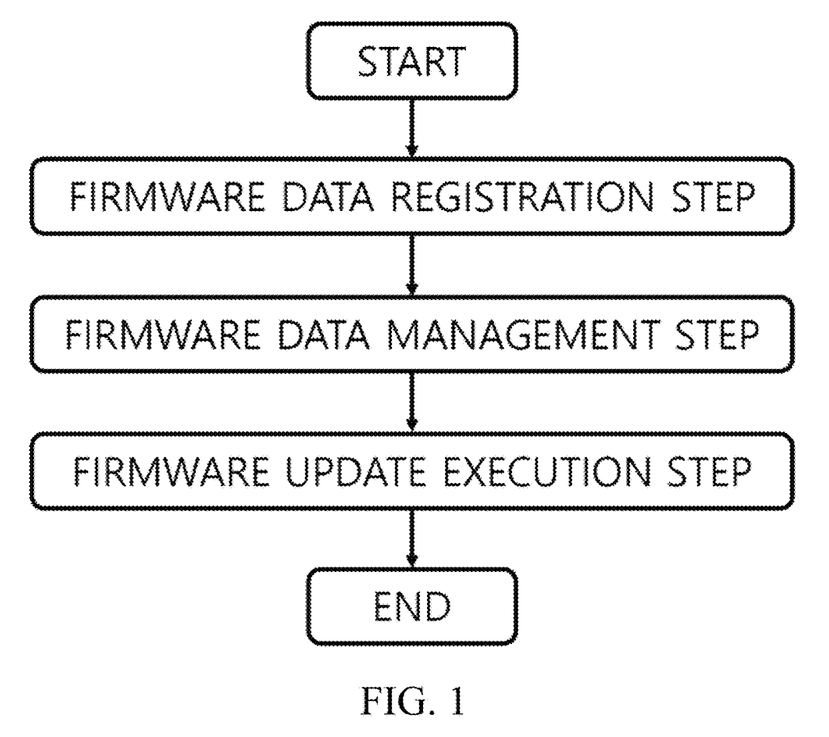
FIG. 1 is a flowchart of a firmware massive update method using a flash memory according to an embodiment of the present invention.
Figure 3:
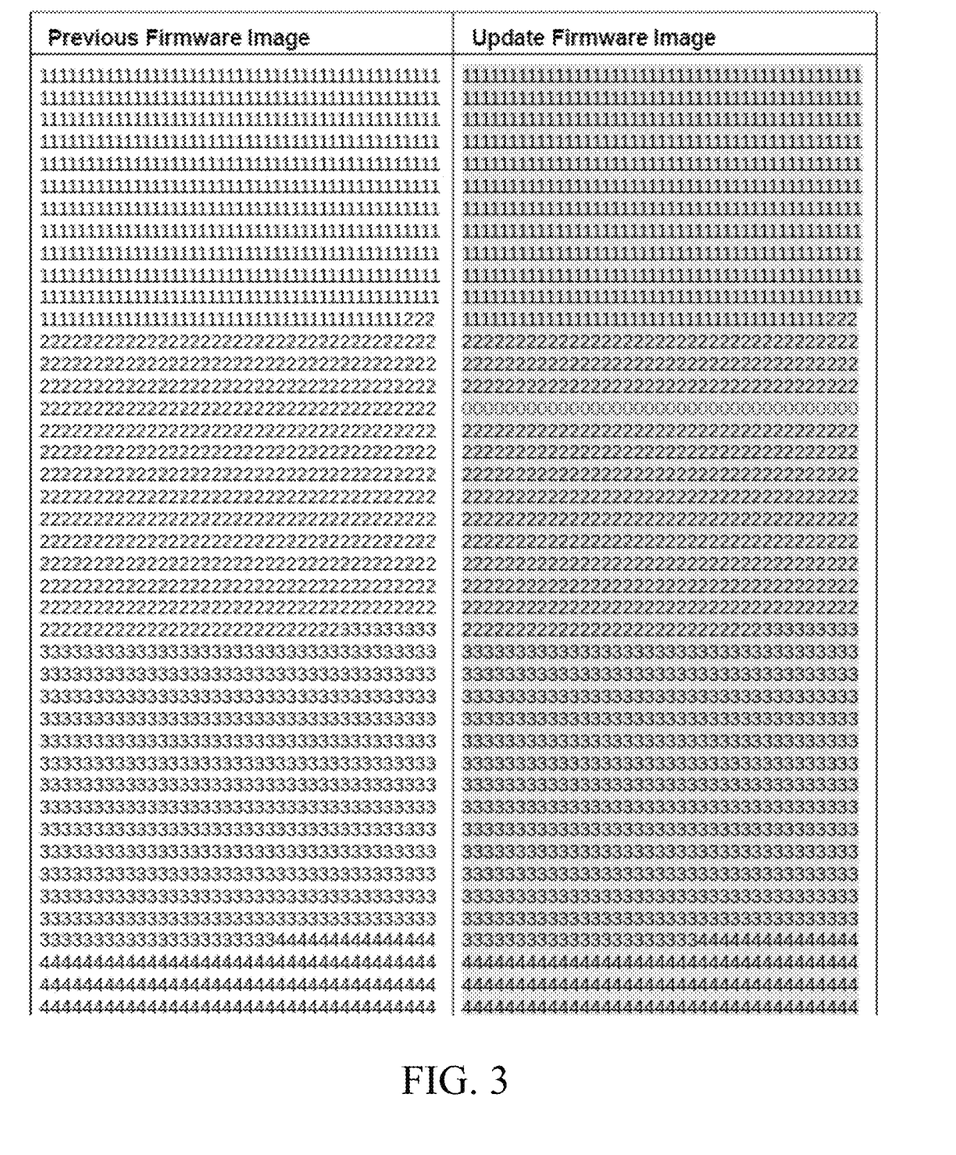
FIG. 3 is an exemplary diagram of a firmware massive update method using a flash memory according to an embodiment of the present invention.

FIG. 1 is a flowchart of a firmware massive update method using a flash memory according to an embodiment of the present invention, and FIG. 3 is an exemplary diagram of a firmware massive update method using a flash memory according to an embodiment of the present invention.

The method may basically include a firmware data registration step, a firmware data management step, and a firmware update execution step.

More specifically, the firmware massive update method using the flash memory may include: a firmware data registration step of receiving, from a manufacturer server, at least one of information of a user device that is a firmware update target, and firmware information and registering the received information as firmware data; a firmware data management step of receiving a request from a firmware update server in which the registered firmware data is stored, and storing and managing the registered firmware data in a specific area of a flash memory included in the user device via a network; and a firmware update execution step of executing a firmware update on the firmware data managed in the specific area of the flash memory included in the user device through the firmware update server.

In addition, the method according to the present invention may be performed in a server. The server may be configured to serve as a web server, a database server, or a mobile server. For example, the server may display a processing result on a webpage through an online network, or may receive necessary input data through a webpage. The webpage may include software for performing a specific task such as a web application as well as simple text, image, sound, video, and the like.

In addition, the server may be configured to provide an interface and an application installed on desktop, laptop, smartphone, tablet personal computer (PC), and the like.

In addition, the online network as used in the present invention may be a core network that is integrated with a wired public network, a wireless mobile communication network, or a portable Internet, or may refer to a worldwide open computer network architecture that provides TCP/IP protocol and several services existing in upper layers thereof, that is, Hyper Text Transfer Protocol (HTTP), Hyper Text Transfer Protocol Secure (HTTPS), Telnet, File Transfer Protocol (FTP), Domain Name System (DNS), Simple Mail Transfer Protocol (SMTP), or the like. However, the online network is not limited to these examples, and may comprehensively refer to a data communication network capable of transmitting and receiving data in various forms.

In addition, the server may exchange and manage data through a transmission medium such as a metal wire, a waveguide, or light including a carrier wave for transmitting a signal designating a program instruction, a data structure, or the like. Examples of the program instruction made in the server may include not only machine code that is generated by a compiler, but also high-level language code that may be executed by a device (e.g., a computer) that electronically processes information by using an interpreter. The hardware devices of the servers may be configured to operate as one or more software modules so as to perform the operations of the present invention, and vice versa.

In addition, a user device described below may include at least one of smartphone, tablet PC, mobile phone, video phone, desktop PC, laptop PC, netbook computer, personal digital assistant (PDA), portable multimedia plater (PMP), wearable device (e.g., smart glasses, head-mounted-device (HIVID), etc.), smart mirrors, kiosk devices, or smart watch. The user device is not limited to these examples, and refers to devices capable of transmitting and receiving a value of an electrically changed signal in various forms.

In addition, examples of the user device may include an input module. The input module may include a plurality of input keys and function keys for receiving numeric or character information and setting various functions. The function keys may include direction keys, side keys, and shortcut keys, which are set to perform specific functions. The input module may generate a key signal related to function control of the user device and transmit the generated key to the user device.

In addition, when the user device supports a full touch screen, the user device may include only a volume key for volume control and a power key for screen on/off and device on/off, which are formed on a side of a case of the user device. In particular, the user device may access the server described in the present invention, generate various input signals such as input signals for executing, controlling, and instructing firmware update, and transmit the input signals to the server described in the present invention.

In addition, examples of the user device may include a user device control module. The user device control module may control overall operations of a user device firmware management method to be received by the user device and a signal flow between internal blocks of the user device, and may also perform a data processing function. The user device control module may include a central processing unit (CPU), an application processor, a software development kit (SDK), and the like. However, the user device control module is not limited to these examples, and may comprehensively refer to a module capable of controlling the user device in various forms.

In addition, the firmware data registration step may include receiving, from the manufacturer server, at least one of information of the user device that is the firmware update target, firmware information, and signature key information, and registering the received information as firmware data.

In addition, the firmware data registration step may further include a data synchronization step of synchronizing data so that the registered data corresponds to the information data of at least one of the information of the user device that is the firmware update target of the manufacturer server, the firmware information, and the signature key information.

In addition, the firmware data registration step may include registering a firmware update target device and module type information of the device. The firmware data registration step may include accessing a device/module type registration page through the manufacturer server, inquiring about a list of module types, inputting device/module type information through the manufacturer server, performing device/module type duplication check, receiving a registration request from the manufacturer server, and storing the device/module type information of the device that is the firmware update target.

The module list of the device is for consistently updating the modules included in the device by type, and may indicate module name, device type (e.g., DCU, PLC, LTE, MCU, etc.), detailed module information (firmware information), etc.

In addition, the device list may indicate module identifier ID, device name, manufacturer, device model, serial number, device access information (IP), device physical information, registration date, detailed device information (firmware information), etc.

In addition, in the firmware data registration step, the firmware information may be registered by the user device that is the firmware update target. The device list and the firmware management information may be inquired through the firmware registration page of the manufacturer server, the device may be selected from the manufacturer server to configure the device information, and the module type information included in the device may be inquired.

In addition, in the firmware data registration step, the firmware information may be registered by the module that is the firmware update target. The manufacturer server may select a module based on the inquired module type information and inquire the firmware list. When firmware data is input from the manufacturer server, firmware duplication may be checked. Therefore, the registration request may be received from the manufacturer server and the firmware information may be stored.

The firmware management information may indicate device identifier ID (firmware management for each module), current firmware identifier ID, DIFF image identifier ID, signature key identifier, update scheduling activation or non-activation, integrity verification scheduling activation or non-activation, new firmware registration or non-registration, last update date, last Integrity check schedule, final integrity check value, and the like.

In addition, the firmware information may indicate device identifier, main module firmware ID, firmware version, firmware data, corresponding data size, firmware data integrity value, registration time, and the like.

In addition, in the firmware data management step, the network is configured based on a gRPC (gRPC Remote Procedure Calls) protocol.

In addition, the network includes various communication protocols, and information exchanged between devices through the network or other media is managed according to rules that can be set in the communication protocol specification.

In addition, the nature of the communication, the actual exchanged data, and the behavior according to any state are defined by this specification. In digital computing systems, rules can be expressed as algorithms and data structures. The protocol is a computation and communication of an algorithm or programming language.

In addition, operating systems usually have a set of collaborative processes that communicate with each other by manipulating shared data. This communication is controlled by a well-understood protocol that may be embedded in the process code itself. In contrast, since there is no shared memory, communication systems must communicate with each other by using a shared transmission medium. The transmission is not necessarily reliable and individual systems may use different hardware or operating systems.

In addition, in order to implement a networking protocol, a protocol software module interfaces with a framework implemented in the operating system of the machine. This framework implements the networking functions of the operating system. When the protocol algorithm is expressed in portable programming languages, the protocol software may be independent of the operating system, and the most well-known frameworks are a TCP/IP model and an OSI model.

In addition, the transmission is not processed by using a single protocol. Instead, a set of collaborative protocols called protocol suite is used. The best known protocol suite is TCP/IP, IPX/SPX, X.25, AX.25, and AppleTalk.

In addition, the protocols may be ordered based on the functionality of the group. For example, there is a transport protocol group. Functions are mapped to layers, and each layer solves a distinct class of problems related to application, transport, Internet, and network interface functions. In addition, in order to transmit a message, a protocol must be selected at each layer. The selection of the next protocol is achieved by extending the message with a protocol selector for each layer.

In addition, examples of the various communication protocols may include Hyper Text Transfer Protocol (HTTP), Hyper Text Transfer Protocol Secure (HTTPS), File Transfer Protocol (FTP), Secure File Transfer Protocol (SFTP), Telnet (Terminal Network), Post Office Protocol version 3 (POP3), Simple Mail Transfer Protocol (SMTP), Secure Shell (SSH), Secure Socket Layer (SSL), Simple Object Access Protocol (SOAP), Address Resolution Protocol (ARP), and the like. However, the communication protocols are not limited to these examples, and may comprehensively refer to any communication protocols of various types commonly known.

In addition, in the firmware data management step, a request to store the registered firmware data in a specific area of the flash memory is received from the user device through the update application included in the firmware update server. In the firmware data management step, the registered firmware data is stored and managed as a firmware image in a specific area of the flash memory. In the firmware update execution step, the firmware update is executed based on the firmware image.

In addition, the flash memory is Micron's Authenta Flash. Micron stores the device's unique key on a Flash Drive, and provides Authenta technology that utilizes a DICE function of generating a new device ID by reflecting a hash value of a firmware code as a method for preventing deterioration of security functions due to the use of modified firmware that may occur during the firmware update process.

In addition, unique password information is embedded in a non-volatile memory. When firmware is updated, this password information is calculated and changed with the unique value included in the firmware. An external management server may also verify the integrity of the firmware applied to the device while decoding the password information through the authentication process. Therefore, it is a technology that has the advantage of making it more difficult to apply malicious firmware in a detour method.

In addition, in the firmware data management step, the user device is operated by storing a boot image in an area A of a specific area of the flash memory.

In addition, in the firmware data management step, the area A of the specific area of the flash memory is set as an Authenticated Modify (AM) block. The area of the specific area of the flash memory is set as the AM block, so that data cannot be written by general access.

In addition, in the firmware data management step, when the boot image is changed, a new boot image is stored in an area B of the specific area of the flash memory through a command.

In addition, the Authenta Flash must follow the procedure of writing data to the legacy block (area B/area B of the specific area of the flash memory) and then copying data to the AM block by using an auth_modify command. In order to write data to the legacy block, sub_sector erase must be preceded. Erase is performed in units of 4 KB, and only a start address may be specified.

Therefore, in the firmware update execution step, data comparison between the firmware image subjected to firmware update and the existing firmware image is performed in units of 4 KB to 64 KB (e.g., data comparison in units of 4 KB, etc.), and only a data value of an address in which the difference occurs is transmitted to the user device. In addition, in the firmware data management step, before the new boot image is stored in the area B of the specific area of the flash memory, the new boot image data may be erased through a Subsector_Erase (Erase Data) command in units of 4 KB to 64 KB, and only a start address value may be specified. As an example, the new boot image data may be erased in the range of units of 4 KB to 64 KB, and only the start address value may be specified.

In addition, referring to FIG. 3, when the firmware image is changed, only the first to 4096th values are written at the start position of the address value where the firmware image is stored, instead of writing the entire firmware image to the AM block of Authenta.

In addition, when there are many different values in the firmware image, whether the interval between the different values is greater than 4096 is checked, how many blocks to use is calculated, and data is written in units of 4 KB.

Therefore, in the firmware data management step, when the firmware image is changed, only the first to 4096th values are stored at the start position of the address value where the existing boot image is stored, without storing the entire changed boot image in the area A of the specific area of flash memory.

In addition, in the firmware data management step, the new boot image stored in the area B of the specific area of the flash memory is copied to the area A of the specific area of the flash memory. When data is completely written to the legacy block, the image is copied with auth_modify. In this case, erase has to be performed earlier.

In addition, the erase of auth_modify may be performed in units of 64 KB. Only the start address may be specified. The area B may be erased and updated in units of 4 KB. Therefore, even after the data (new boot image) of the legacy block (area B) that records the firmware image to be updated is updated to the area A, the lock may be set so as to protect against damage.

Therefore, in the firmware data management step, before the new boot image is copied to the area A of the specific area of flash memory, the new boot image data may be erased in units of 4 KB to 64 KB through the Subsector_Erase (Erase Data) command, and only the start address value may be specified. As an example, the new boot image data may be erased in the range of units of 4 KB to 64 KB, and only the start address value may be specified.

In addition, the above-described method according to the present invention may be implemented in the form of program instructions that can be executed through various computer means, and may be recorded on a computer-readable recording medium. The computer-readable recording medium may include program instructions, data files, data structures, and the like alone or in combination. The program instructions recorded on the recording medium may be specially designed and configured for the present invention, or may be known and available to those of ordinary skill in the art in the technical field of computer software.

In addition, examples of the computer-readable recording medium may include magnetic media such as hard disk, floppy disk, and magnetic tape, optical media such as CD-ROM and DVD, magneto-optical media such as floptical disk, and hardware device specially configured to store and execute program instructions, such as ROM, RAM, flash memory.

Furthermore, examples of the program instructions may include not only machine language codes generated by a compiler, but also high-level language codes that can be executed using an interpreter by a computer. The hardware device described above may be configured to operate as one or more software modules so as to perform the operations of the present invention, and vice versa.

In addition, it can be seen that the present invention can be realized in the form of hardware, software, or a combination of hardware and software. Regardless of whether erasable or rewritable, such software may be store in volatile or non-volatile storage devices, memory such as RAM, memory chip, or integrated circuit, or storage media such as CD, DVD, magnetic disk, or magnetic tape, etc., which can record data optically and magnetically and can read data by a machine (e.g., a computer).

Therefore, the present invention includes a program including code for implementing the above-described method and a machine-readable storage media storing such a program. Such a program may be transported electronically over any media such as a communication signal carried over a wired or wireless connection. The present invention suitably includes equivalents thereto.

Figure 2:
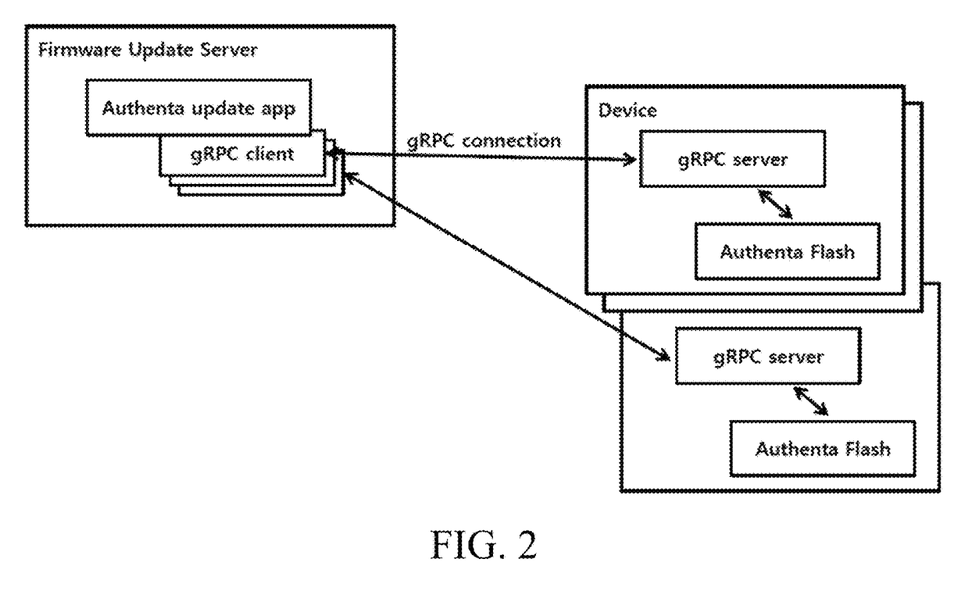
FIG. 2 is a conceptual diagram of a firmware massive update method using a flash memory according to an embodiment of the present invention.

FIG. 2 is a conceptual diagram of a firmware massive update method using a flash memory according to an embodiment of the present invention.

More specifically, an Authenta update application of a firmware update server can update a firmware image written to Authenta flash of a device.

In addition, in order to update the firmware image, an existing firmware image and an image to be updated are compared with each other in units of 4 KB, and only a data value of an address where the difference occurs is transmitted to the device.

In addition, gRPC (Remote Procedure Calls) protocol is used for communication between the firmware update server and the device.

In addition, when a gRPC client that performs gRPC communication generates a command and transmits the command to a gRPC server, the gRPC server transmits the command to the Authenta flash and writes data to the flash.

Figure 4:
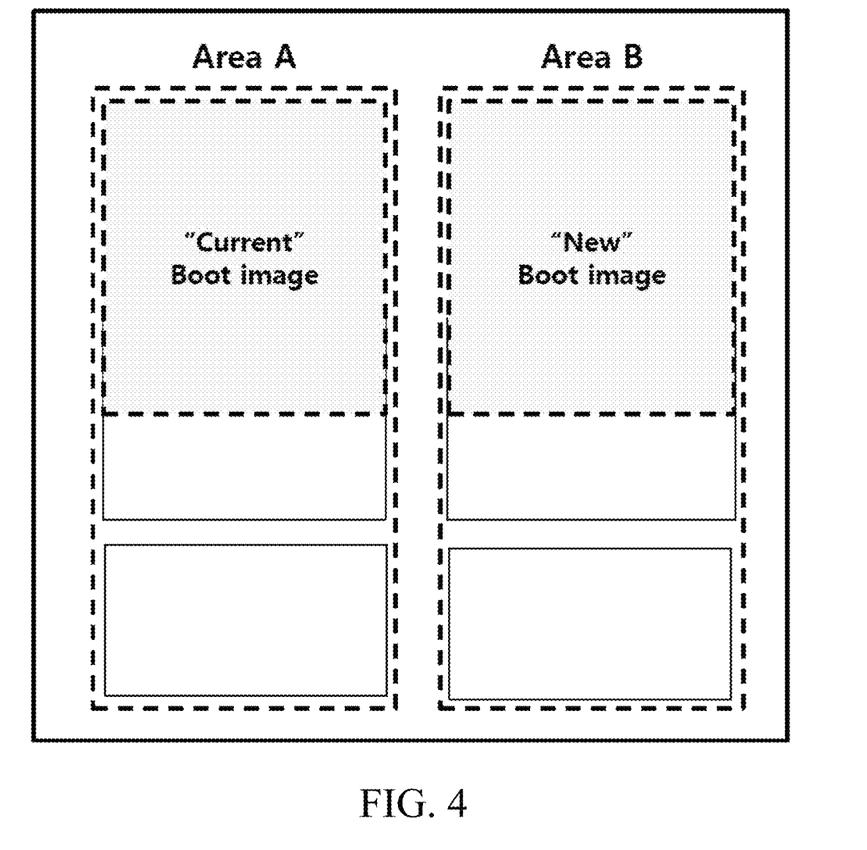
FIG. 4 is an exemplary diagram of a firmware massive update method using a flash memory according to an embodiment of the present invention.

FIG. 4 is an exemplary diagram of a firmware massive update method using a flash memory according to an embodiment of the present invention.

1. The boot Image is stored in area A of the Authenta flash memory and the device is configured to operate using the image.

2. Area A is set to AM block, and data cannot be written by general access.

3. When a situation that must change the boot image occurs, the new boot image is written to area B by using the following commands.

DYB_Write: Unlock the legacy block
Subsector_Erase: Erase data
Page_Program: Write image data
DYB_Write: Lock the legacy block 4. The image written to area B, i.e., the legacy block, is copied to area A, i.e., the AM block.

Auth_modify: Copy the image from area B to area A.
Measure: Obtain the hash value of the image written to area A.

5. It is checked whether the hash value of the image written to area A is the same as the hash value of the new boot Image.

6. The device is reset to confirm that the device operates with "New" boot Image.

In the firmware massive update method using the flash memory and the computer program stored in the recording media for executing the same according to the present invention, when the firmware image is updated to Authenta flash by using the characteristics of Authenta flash, the difference from the existing firmware image is calculated in blocks, and thus it is possible to minimize data transmission and improve performance.

In addition, based on the above effects, it is possible to safely update the firmware image recorded on the Authenta flash within a short time.

However, the effects of the present invention are not limited to those described above, and the effects not mentioned will be clearly understood from the present specification and accompanying drawings by those of ordinary skill in the art.

The present invention has been described with reference to the accompanying drawings, focusing on the specific shape and direction. However, various modifications and changes can be made thereto by those of ordinary skill in the art. Such modifications and changes should be construed as falling within the scope of the present invention.

What is claimed is:

1. A firmware massive update method using a flash memory, the firmware massive update method comprising:
    a firmware data registration step of receiving, from a manufacturer server, at least one of information of a user device that is a firmware update target, and firmware information and registering the received information as firmware data;
    a firmware data management step of receiving a request from a firmware update server in which the registered firmware data is stored, and storing and managing the registered firmware data in a specific area of a flash memory included in the user device via a network; and
    a firmware update execution step of executing a firmware update on the firmware data managed in the specific area of the flash memory included in the user device through the firmware update server,
    wherein the firmware data management step comprises storing and managing the registered firmware data in the specific area of the flash memory as a firmware image, and the firmware update execution step comprises executing the firmware update based on the firmware image,
    wherein the firmware update execution step comprises comparing a firmware image subjected to firmware update with an existing firmware image in units of 4 KB to 64 KB and transmitting, to the user device, only a data value of an address where a difference occurs.

2. The firmware massive update method of claim 1, wherein the firmware data management step comprises setting an area A of the specific area of the flash memory as an Authenticated Modify (AM) block.

3. The firmware massive update method of claim 1, wherein the firmware data management step comprises configuring the network based on a gRPC (gRPC Remote Procedure Calls) protocol.

4. The firmware massive update method of claim 1, wherein the firmware data management step comprises receiving a request from the user device to store the registered firmware data in the specific area of the flash memory through an update application included in the firmware update server.

5. A computer program stored in a non-transitory computer-readable recording media for executing the method according to claim 1.

6. A firmware massive update method using a flash memory, the firmware massive update method comprising:
    a firmware data registration step of receiving, from a manufacturer server, at least one of information of a user device that is a firmware update target, and firmware information and registering the received information as firmware data;

a firmware data management step of receiving a request from a firmware update server in which the registered firmware data is stored, and storing and managing the registered firmware data in a specific area of a flash memory included in the user device via a network; and a firmware update execution step of executing a firmware update on the firmware data managed in the specific area of the flash memory included in the user device through the firmware update server, wherein the firmware data management step comprises operating the user device by storing a boot image in an area A of the specific area of the flash memory, and wherein the firmware data management step comprises, when the boot image is changed, storing a new boot image in an area B of the specific area of the flash memory through a command.

7. The firmware massive update method of claim 6, wherein, in the firmware data management step, before the new boot image is copied to the area B of the specific area of flash memory, new boot image data is erased in units of 4 KB to 64 KB through a Subsector_Erase (Erase Data) command, and only a start address value is specified.

8. The firmware massive update method of claim 6, wherein the firmware data management step comprises copying the new boot image, which is stored in the area B of the specific area of the flash memory, to the area A of the specific area of the flash memory.

9. The firmware massive update method of claim 8, wherein, in the firmware data management step, before the new boot image is copied to the area A of the specific area of flash memory, new boot image data is erased in units of 4 KB to 64 KB through a Subsector_Erase (Erase Data) command, and only a start address value is specified.

10. A firmware massive update method using a flash memory, the firmware massive update method comprising:

a firmware data registration step of receiving, from a manufacturer server, at least one of information of a user device that is a firmware update target, and firmware information and registering the received information as firmware data;

a firmware data management step of receiving a request from a firmware update server in which the registered firmware data is stored, and storing and managing the registered firmware data in a specific area of a flash memory included in the user device via a network; and a firmware update execution step of executing a firmware update on the firmware data managed in the specific area of the flash memory included in the user device through the firmware update server, wherein the firmware data management step comprises operating the user device by storing a boot image in an area A of the specific area of the flash memory, and wherein, in the firmware data management step, when the firmware image is changed, only first to 4096th values are stored at a start position of an address value where an existing boot image is stored, without storing an entire changed boot image in the area A of the specific area of flash memory.

\* \* \* \* \*